Patented May 29, 1928.

1,671,194

UNITED STATES PATENT OFFICE.

HEINRICH KOPPERS, OF ESSEN-RUHR, GERMANY, ASSIGNOR TO THE KOPPERS DEVELOPMENT CORPORATION, OF PITTSBURGH, PENNSYLVANIA, A CORPORATION OF PENNSYLVANIA.

PROCESS FOR COKE-OVEN HEATING AND THE LIKE.

No Drawing. Application filed July 5, 1921, Serial No. 482,614, and in Germany April 4, 1917.

This invention relates to a process for increasing the heating economy of gas firing plants, particularly in connection with coke or gas ovens.

In the heat recovery for gas firing plants which, as is well known, is carried out by transmitting the surplus waste heat to the combustion agents, air and gas, or only to the air alone,—quite aside from the efficiency degree of the heat recovery in itself—a full utilization of the heat available cannot be accomplished for the reason that the specific heat of the burnt gases is higher than that of the combustion media to be preheated; the gases passing out through cracks of untight oven walls, and other losses, are apt to greatly increase this disproportion. The conditions involved in this connection are more fully elucidated in German Letters Patent 196,532, where it is also proposed to increase the thermal efficiency of such gas fired plants by splitting off from the highest temperature, in addition to the effective heat proper supplied to the charge of the oven, a second effective heat quantity, at a lower but still rather high degree of temperature, for separate use, which second effective heat therefore does not participate at all in the route through the recovery plant. However correct and excellent this idea is, it is necessary, on the one hand, to give the oven plant a special shape for withdrawing this high value waste heat, and on the other hand a suitable use is not always available either for such waste heat.

The heating of the coke ovens with heat recovery by means of high value gas of their own and hot air is tantamount to an intensity heating such as corresponds, for instance in the Martin oven, to the nature of the process to be carried out. Now the coking of the coal and the recovery of the by-products, however does not require the action of very high temperatures—these are even detrimental on account of the danger of decomposing the by-products, but rather the effect of great heat quantities at a degree of temperature which lies between from 500 to 1000 degrees centigrade. In the coking the rapidity of the same depends on the heat conductivity of the coke and the amount of heat required for converting the coal into coke. Now, if more heat is furnished per time unit than is required by the charge or than the latter can "digest", as it were, the temperature at the inner wall surface is unnecessarily raised, and the distilling products, which always take the route from the coal through the coke to the wall and upward of the latter, are decomposed further than is necessary.

The invention solves the problem of bringing about a compensation inside of the oven plant itself; it does so by inserting a heating pause at suitable intervals by stopping the gas supply, the air alone flowing through the oven plant during that pause in order to be able to discharge the heat surplus carried over into the heat recovery plant or stored locally in the entire oven plant for effective utilization in connection with the oven charge to be heated. The air therefore charges itself at the hotter places with the surplus heat in order to again yield the same at the colder places, whereby at the same time a desirable equalization of the temperature takes place inside of the oven plant, which for instance prevents the fire proof stone material from becoming soft. Attempts have already been made in coke oven plants, by stopping the heat at different times at a certain carbonizing stage of the oven, to bring about such a compensation of heat within the oven and the charge, which is based on a similar idea to that of the well known soaking pits (Gyers' pits); since the fire-proof stone material and the glowing coke show a very poor heat conductivity, however, as against the steel blocks inserted in such pits, this operating manner for bringing about such a compensation is not very suitable; rather is a special medium necessary which charges itself with the heat and thus transmits the same from the hotter to the colder places.

In ovens which operate with heat recovery operated on the alternating draft change principle, with regenerators, this heating pause naturally will be so connected with the draft alternation made at any time that the pause will be arranged between the stopping of the gas on the one hand and the restarting on the other hand. For the specific carrying out of this idea the following reflections are the guiding principles; at the moment just after the stopping of the gas the oven side which has just been fired directly, still, of course, possesses in the masonry also acting as a heat storer, a temperature which is higher than that of the charge, which must be considered as utilizable heat. It is therefore advisable not to feed this heat quantity (approximately from 1000 to 1050 degrees centigrade) to the heat recovery plant, because this would occur in connection with a draft change initiated immediately with the turning off of the gas, but rather to take it, by means of the air current remaining unchanged in the first place, to the other oven half, on which route it is supplied as effective heat to the charge. With the equalization of this heat surplus however the conditions change in that, with an unchanged direction of the draft, the air entering through the already exhausted regenerator of the one side, would now, in the regenerator of the opposite side, which from the previous operating stage has reached its highest temperature and heat quantity, pass over with a maximum temperature into the waste heat channel and thus the chimney; in this way, therefore, heat would only be carried uselessly from the total plant into the chimney.

If therefore, after the above mentioned compensation has taken place, the draft direction is changed, the air now first passes through the waste heat storer brought to its highest temperature and heat quantity, and is preheated there accordingly in order to give the surplus heat to the oven plant and then passes through the emptied heat storer of the other side. Here the heated air therefore is cooled down to the lowest temperature possible, so that, on the one hand, the effective heat yielded to the charge by the air becomes greatest in this manner and the loss discharged into the chimney—according to the heating of the air from the temperature of the environment to the final temperature when leaving the regenerator—is reduced to a minimum. Without the carbonizing period being effected thereby, a saving in gas, a temperature equalization and the prevention of heat losses are thus obtained alongside of each other, while the coking is carried out in such a way that no useless heating of a detrimental nature for the by-products takes place inside of the oven plant.

In coke oven plants, with a draft alternation occurring every 20 to 30 minutes, a heating pause of about seven minutes will result, and on the strength of the explanations just furnished, the old draft direction is then permitted to continue for about half the time after the turning off of the gas, i. e. three and one-half minutes, while after this for another three and one-half minutes the air is permitted to flow through the plant in the opposite direction. There is furthermore the advantage that the reversing for turning off the gas can be symmetrically made in the draft alternation, inasmuch as the turning off of the gas, the draft alternation and the returning off of the gas forward and backward take place at the same intervals. By taking such an oven plant with individual regenerators as a basis, it is possible in the present instance to proceed in such a way that the ovens are operated as units by themselves and the timing of the alternations effected in a manner designated as "cyclic shift". In this connection the gas accumulation caused by the turning off of the individual oven, then becomes so slight that it can either be absorbed by the rooms existing in the plant as whole with a slight admissible increase in pressure or equalized by means of a gas receptacle which in that case will be correspondingly small, or by means of the well known automatic pressure regulators.

Now the present process permits of a very peculiar evolution; it is well known in itself to replace the irregular chimney draft action, which depends on weather conditions, by artificial draft, for instance a blower, in order to lower still further the temperature of about 250 degrees required for the chimney draft. As is shown by the above statements, no special interest whatever exists in oven plants heretofore operated with heat recoveries to save this heat requirement of the chimney, because in consequence of the failure or even inability heretofore to utilize the surplus heat, more than abundant heat is available any way for the chimney draft. When using the process according to the present invention, however, conditions are changed in that this heat surplus is now utilized, thus making it possible to consider the idea of replacing the chimney by a suction blower and prolonging the heating pause to a slight adequate extent. Now in order to avoid in this connection the condensation of sulphuric acid that is present in the waste gas, the utilization of the waste heat in the heat recovery plant is only carried to the point where it is discharged at approximately 100 to 150 degrees centigrade, in this manner the highest heat economy possible is then obtained without resulting in interfering side phenomena such as are caused by acid corrosion.

What is claimed is—

1. In operating a regenerative gas-fired coking furnace having a combustion chamber in which the direction of the draft is periodically reversed, and having air supplies, gas supplies, and regenerators communicably connected with said combustion chamber, and in which a coal charge is being coked by combustion of gas and air in said combustion chamber, the improvement for increasing the heat economy of said coking furnace comprising: effecting a cessation of combustion therein by shutting off the supply of gas thereto; and lowering the temperature of the hottest portions of the furnace and distributing heat therefrom to relatively cooler portions of the furnace and to the coal charge, during the cessation, by flowing air alone through said combustion chamber during the cessation and for a substantial interval after substantial combustion therein has ceased, so as to permit said air to act as a mere heat carrier and distributer and effecting, through the air flow, a transfer of heat, by convection and absorption, from the hottest to the relatively cooler portions of said combustion chamber and regenerators; thereby minimizing the temperature differences throughout the furnace, thereafter introducing the gas to the combustion chamber, and resuming the combustion in said combustion chamber while the same said charge is in the furnace.

2. In operating a regenerative gas-fired furnace having a combustion chamber in which the direction of the draft is periodically reversed, and having air supplies, gas supplies, and regenerators communicably connected with said combustion chamber, and in which a charge is being heat treated by combustion of gas and air in said combustion chamber, the improvement for increasing the heat economy of said furnace comprising: effecting a cessation of combustion therein by shutting off the supply of gas thereto; and lowering the temperature of the hottest portions of the furnace and distributing heat therefrom to relatively cooler portions of the furnace and to the charge, during the cessation, by flowing air alone through said combustion chamber during the cessation and for a substantial interval after substantial combustion therein has ceased, so as to permit said air to act as a mere heat carrier and distributer and effecting, through the air flow, a transfer of heat, by convection and absorption, from the hottest to the relatively cooler portions of said combustion chamber and regenerators; thereby minimizing the temperature differences throughout the furnace, thereafter introducing the gas to the combustion chamber, and resuming the combustion in said combustion chamber while the same said charge is in the furnace.

3. A method as claimed in claim 2 and in which the direction of the draft and the air flow during such cessation is reversed at about the middle of the cessation interval, to provide a flow of air alone in both directions through said combustion chamber before combustion is resumed therein.

4. A method as claimed in claim 1, and in which the cessation interval is for about one-fourth of the period between the draft reversals, and in which the direction of the draft and of the flow of air alone during the cessation is reversed at about the middle of the cessation interval, to provide a flow of air alone in both directions through said combustion chamber before combustion is resumed and so that the periods between successive reversals may be substantially the same.

5. A method as claimed in claim 1 and in which the period between draft reversals is from twenty to thirty minutes and in which the cessation interval is for about seven minutes of said period, and in which the direction of the draft and flow of air alone during the seven minutes of the cessation interval is reversed at about the middle of the seven minute interval, to provide a flow of air alone in both directions through the combustion chamber and regenerators of said furnace and to provide about three and one-half minutes of flow of air alone in each direction during each period between the draft reversals 6. A method as claimed in claim 1 characterized by reducing the temperature of the escaping gases to about 100° to 150° C. by means of forced air blast, in order to increase the utilization of the heat to its maximum without occasioning troublesome incidents such as condensation of sulphuric acid.

HEINRICH KOPPERS.